United States Patent [19]

Proffit

[11] Patent Number: 4,550,930
[45] Date of Patent: Nov. 5, 1985

[54] GOLF CADDY

[76] Inventor: John D. Proffit, Rte. 12, Box 150, Clarksville, Tenn. 37040

[21] Appl. No.: 546,298

[22] Filed: Oct. 28, 1983

[51] Int. Cl.⁴ .............................................. B62B 1/04
[52] U.S. Cl. .................................... 280/655; 224/274; 280/47.18; 280/DIG. 6; 280/47.26
[58] Field of Search .................. 280/DIG. 5, DIG. 6, 280/646, 652, 654, 655, 659, 47.18, 47.26; 180/DIG. 906, DIG. 908; 297/217; 224/274

[56] References Cited

U.S. PATENT DOCUMENTS

| | | | |
|---|---|---|---|
| 2,570,504 | 6/1949 | Van House | 280/DIG. 6 |
| 2,610,072 | 9/1952 | Head | 280/DIG. 6 |
| 2,711,027 | 6/1955 | Williamson | 280/DIG. 6 |
| 2,772,720 | 12/1956 | Zody | 280/163 |
| 2,950,748 | 8/1960 | Olinghouse | 280/DIG. 6 |
| 3,128,021 | 4/1964 | Habbena | 224/274 |
| 3,131,842 | 5/1964 | Dingle | 224/274 |
| 3,189,364 | 6/1965 | Westphal | 280/DIG. 6 |
| 4,082,209 | 4/1978 | Sanders | 224/274 |

FOREIGN PATENT DOCUMENTS

| | | | |
|---|---|---|---|
| 786137 | 11/1957 | United Kingdom | 280/659 |
| 1502414 | 3/1978 | United Kingdom | 224/274 |

Primary Examiner—David M. Mitchell
Assistant Examiner—Richard M. Camby
Attorney, Agent, or Firm—Harvey B. Jacobson

[57] ABSTRACT

A two-wheeled cart incorporating an upstanding frame is provided and includes a lower horizontal platform projecting rearward of the frame for supporting a golf bag and an upper forwardly projecting retractable handle assembly. Opposite side portions of the cart support swingably retractable horizontal supports and one of the supports is designed to have a cooler supported therefrom while the other support mounts a seat cushion. The handle of the cart includes a ball carrier as well as score pad and golf tee support structure and one wheel of the cart includes a resettable distance travelled indicator while the other wheel is axially adjustable relative to the cart.

12 Claims, 11 Drawing Figures

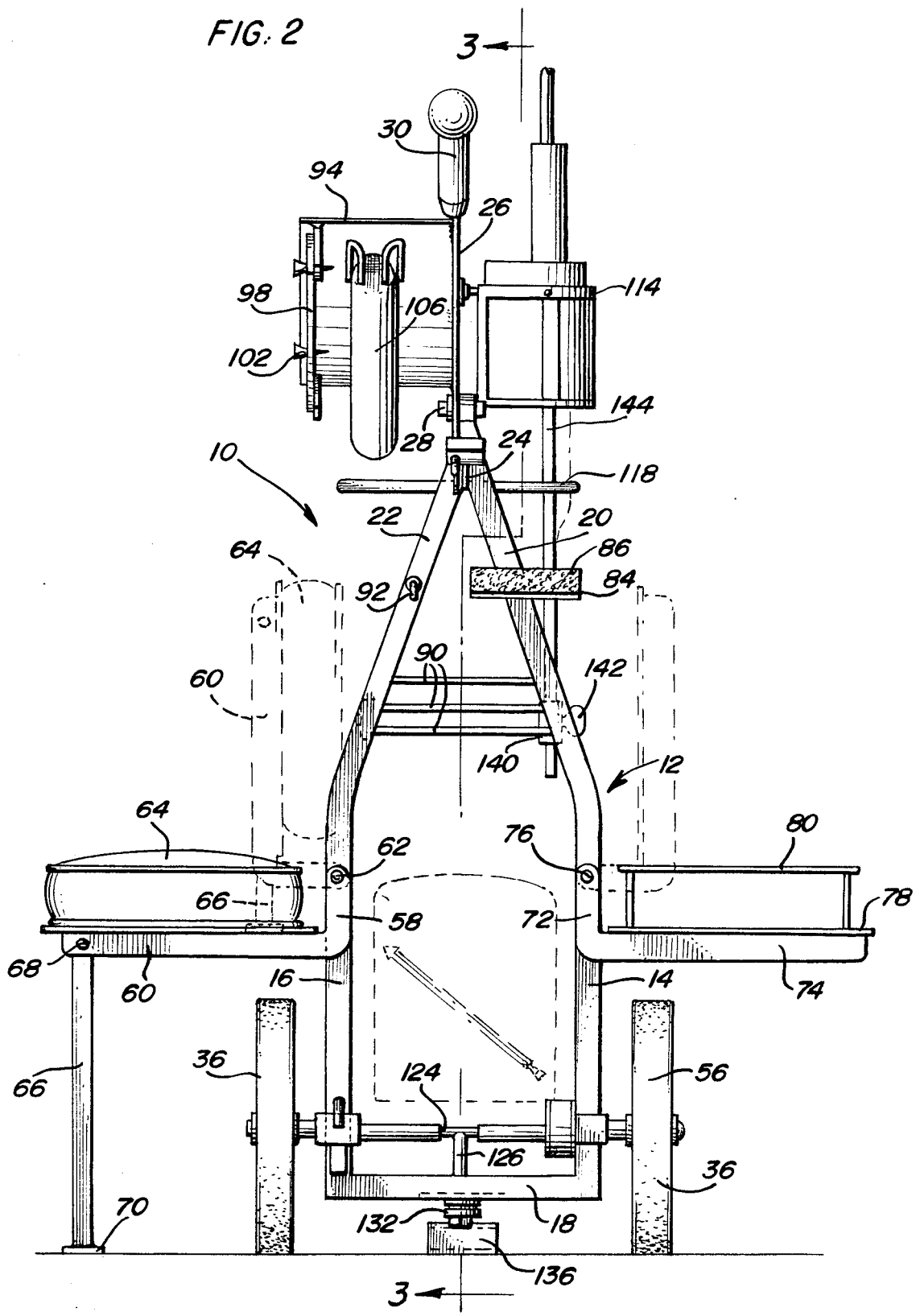

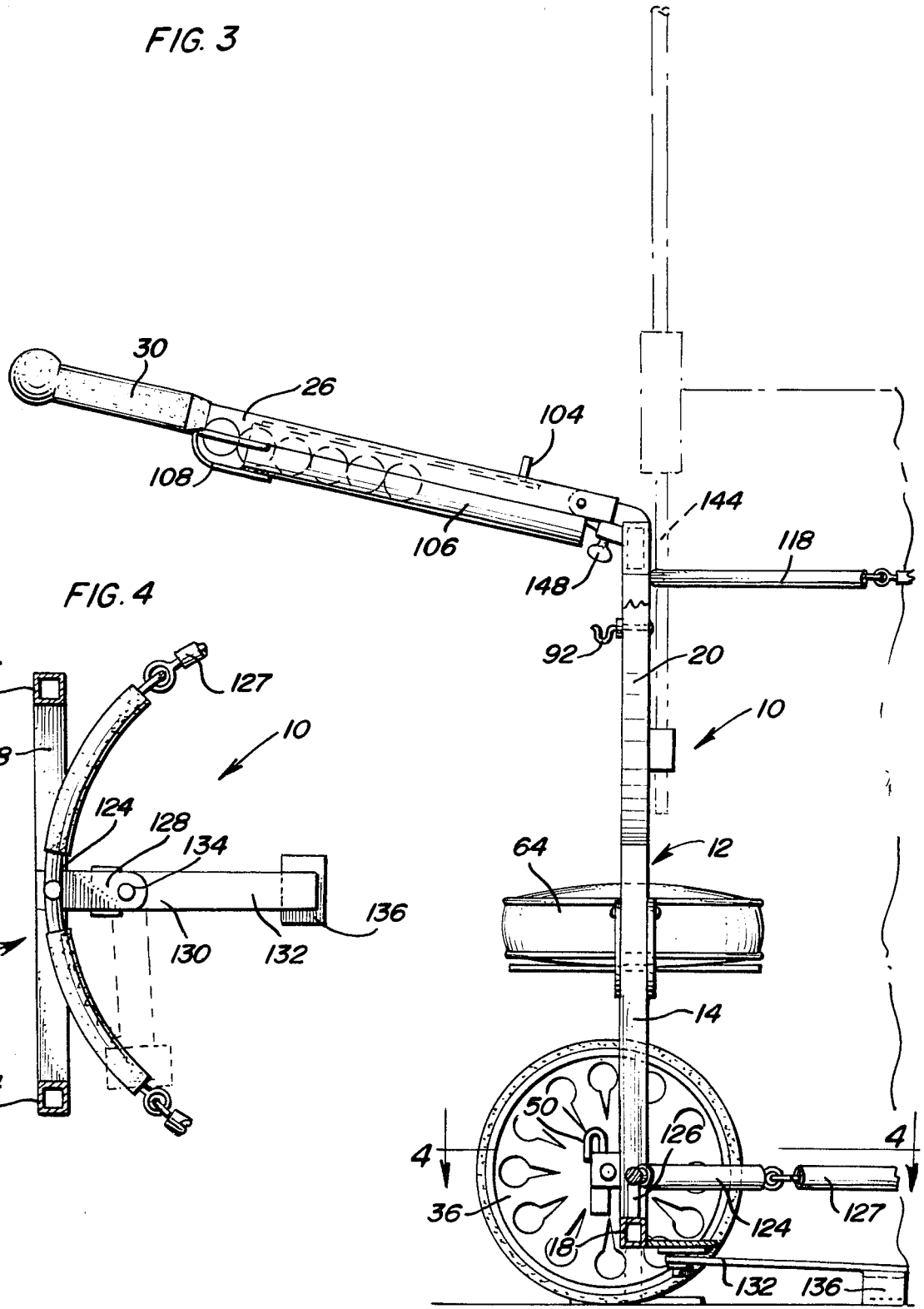

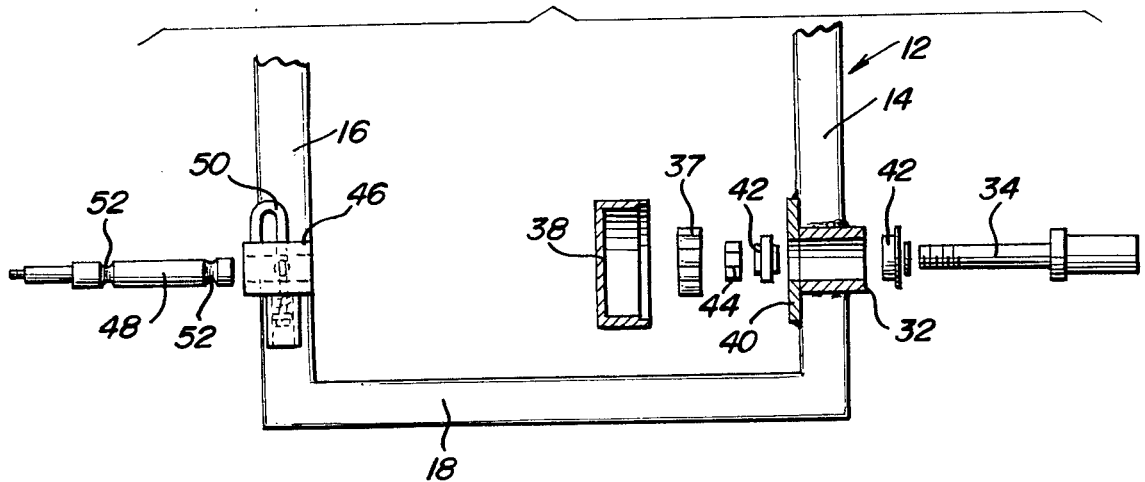
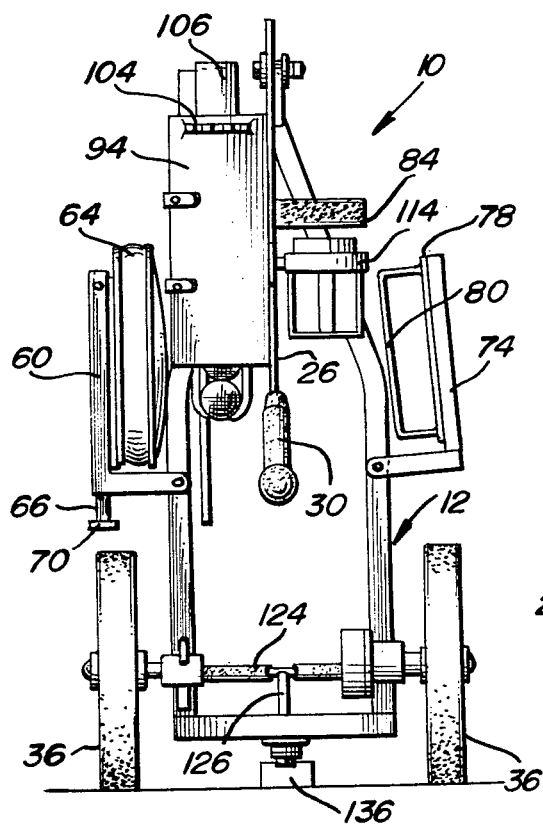
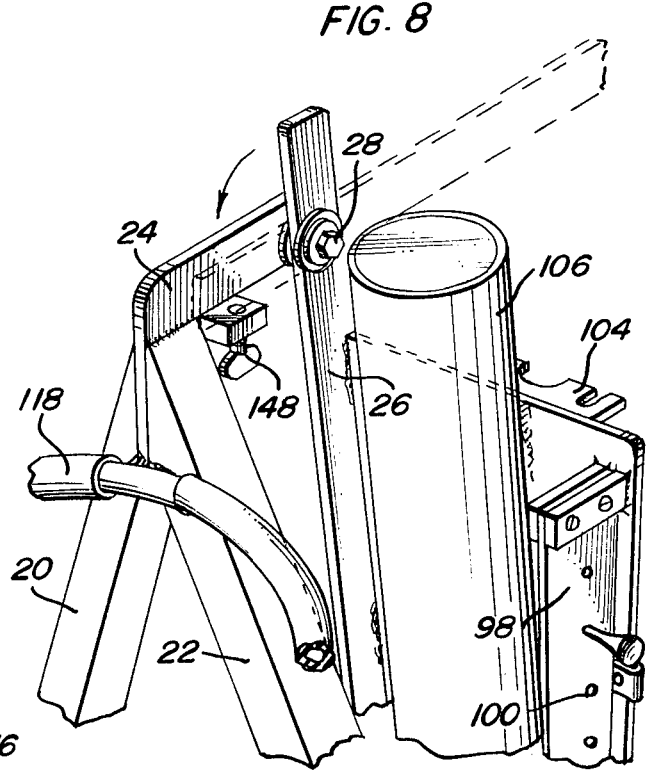

GOLF CADDY

BACKGROUND OF THE INVENTION

Golf has been a popular sport for many years and various different forms of carts heretofore have been provided to support a golfer's bag of clubs while the golfer plays a particular golf course. Some forms of carts are non-powered and must therefore be pushed or pulled by a golfer and other forms of carts are powered and include provisions thereon for supporting the golfer as well as his bag of clubs.

Such powered carts are sufficient in size to support other items such as coolers, seats, umbrellas, and other golfing accessories, but most handcarts include structure for supporting little more than a bag of golf clubs.

In the past, persons who used handcarts did so either because of the unavailability of powered carts or because of financial or physical exercise reasons and if motorized carts were available to the more affluent golfers such persons would rent motorized golf carts.

However, the recent increase of interest in physical conditioning has prompted even the affluent golfer to use a handcart rather than a motorized cart. The more affluent golfer is accustomed to many of the golfing accessories which previously could be carried only on a motorized golf cart. These accessories include drink coolers, seats, umbrellas and the like. Accordingly, a need exists for a golf cart of the hand type and which may be used by golfers wishing to receive maximum physical exercise while golfing and yet which will be capable of supporting numerous of the golfing accessories previously limited to motorized golf carts.

Examples of various different forms of golf carts including some of the general structural and operational features of the instant invention are disclosed in U.S. Pat. Nos. 2,711,027, 2,772,113, 2,780,508, 2,806,711, 3,147,988, 3,162,461, 3,164,339, 3,620,546, 3,707,279, 3,733,086, 3,866,934, 4,032,054 and 4,262,928.

BRIEF DESCRIPTION OF THE INVENTION

The golf cart of the instant invention incorporates, generally, an upstanding wheeled frame including a lower horizonal shelf projecting from the rear side of the frame and a retractable forwardly projecting handle carried by an upper portion of the frame. A first side of the frame includes a retractable support for supporting a cooler therefrom while the other side of the frame retractably mounts a seat structure. In addition, structure is provided on the frame for support of an umbrella and the handle of the cart supports a ball caddy, a scorecard support, a golf tee support and a drink container support. Further, one disclosed form of the invention includes a resettable distance travelled indicator operated by one of the wheels of the cart.

The main object of this invention is to provide a golf cart to be used by golfers wishing to obtain maxiumum exercise while golfing and wherein the cart is provided with structure for supporting a golf bag as well as a plurality of golf accessories therefrom and which may be collapsed into a compact state for ready storage and transport within the luggage compartment of a vehicle.

Another object of this invention is to provide a golf cart which will be capable of supporting various different types of golfing accessories such as a golf ball receiver, a score pad, golf tees, a drink container holder and an umbrella.

Another very important of this invention is to provide a golf cart also including retractable structure for supporting a cooler therefrom as well as a seat structure.

Yet another object of this invention is to provide a golf cart which will be able to indicate distance travelled from each golf tee.

A final object of this invention to be specifically enumerated herein is to provide a golf cart in accordance with the preceding objects and which will conform to conventional forms of manufacture, be of simple construction and each to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an enlarged front elevational view of the golf cart and with retracted positions of the cooler support and seat structure illustrated in phantom line;

FIG. 3 is a vertical sectional view taken substantially upon the plane indicated by the section line 3—3 of FIG. 2 and with the handle of the cart in a slightly more lowered position;

FIG. 4 is a fragmentary horizontal sectional view taken substantially upon the plane indicated by the section line 4—4 of FIG. 3;

FIG. 6 is a fragmentary elevational view of the lower end of the frame of the golf cart with portions of the two axle assemblies thereof in exploded position and other portions illustrated in vertical sections;

FIG. 7 is a front elevational view of the golf cart on somewhat of a reduced scale and with the various foldably retractable portions thereof in retracted positions;

FIG. 8 is a fragmentary perpective view of the upper portion of the frame of the golf cart illustrating the adjacent handle portion in foldably retracted position;

DETAILED DESCRIPTION OF THE INVENTION

Figure 1:
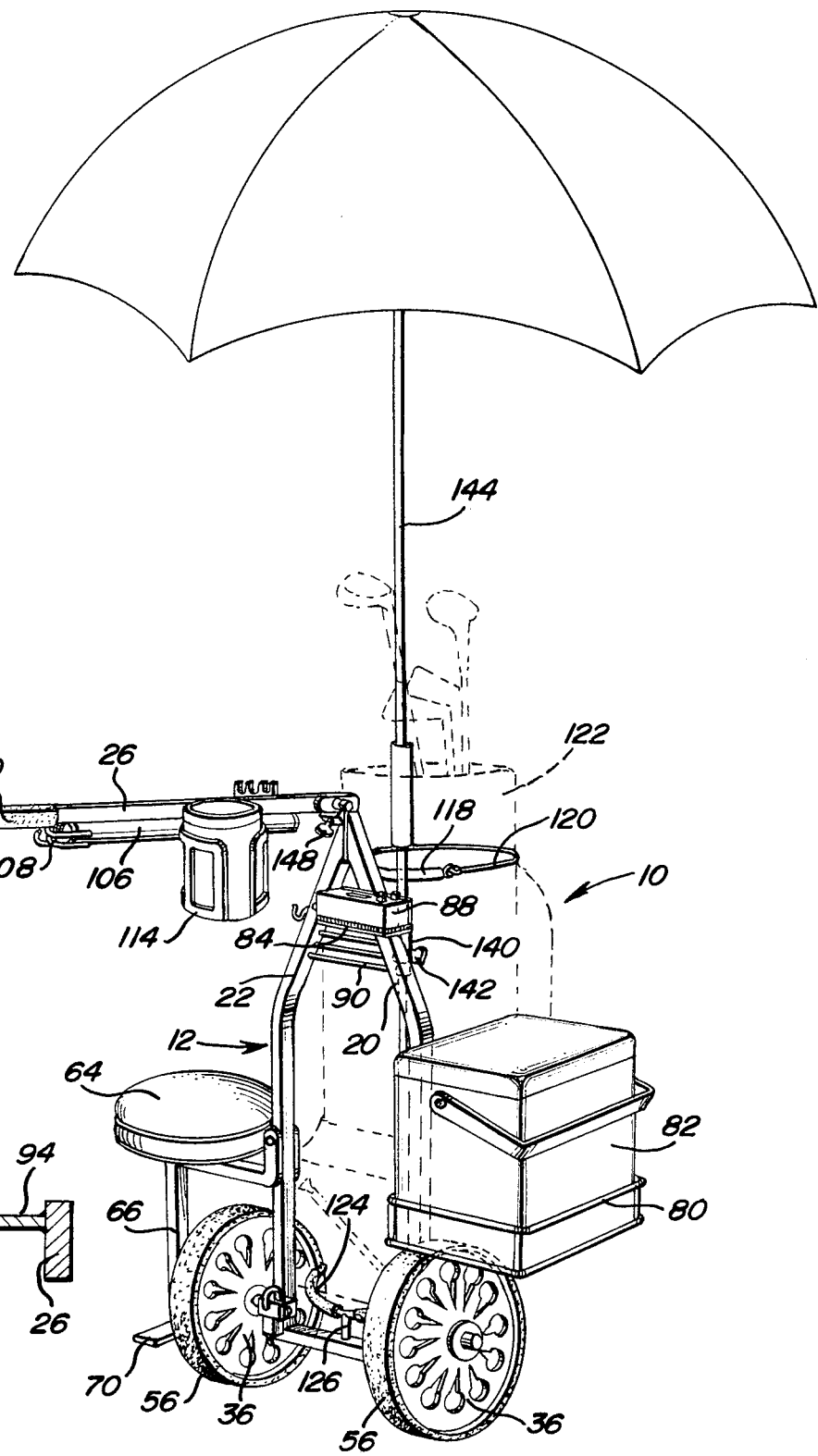
FIG. 1 is a perspective view of a first form of golf cart constructed in accordance with the present invention.

Referring now more specifically to the drawings, the numeral 10 generally designates a first form of golf cart constructed in accordance with the present invention. The golf cart 10 includes an upstanding frame referred to in general by the reference numeral 12 and the frame 12 includes upstanding opposite side members 14 and 16 interconnected at their lower ends by means of a horizontal transverse member 18. The upper end portions 20 and 22 of the opposite side members 14 and 16 are upwardly convergent and secured together by an upper end gooseneck stem 24 secured therebetween. One end of an elongated handle arm is pivotally anchored to the gooseneck stem 24 by a friction washer equipped pivot connection 28 and the handle arm 26 includes a free end equipped with a handgrip 30 and is swingable between the extended positions of the handle arm 26 illustrated in FIGS. 1, 2 and 3 and a folded collapsed position such as that illustrated in FIGS. 7 and 8.

With attention now invited more specifically to FIG. 6 of the drawings, it may be seen that the side member 14 has a collared sleeve 32 supported therefrom and that a live axle 34 upon which a wheel 36 is stationarily mounted is journalled through the sleeve 32 and equipped with a point cam 37 on its inner end. The point cam 37 is enclosed by a removable cover 38 supported from the flange 40 of the sleeve 32 and the axle is journalled in the sleeve 32 by flange bearings 42 and retained through the sleeve 32 by a hex nut 44.

The side member 16 of the frame 12, on the other hand, has a sleeve 46 supported therefrom through which a slidable adjustable and removable axle 48 is journalled. The sleeve 46 supports a spring biased locking pin 50 therefrom and the pin 50 is selectively engageable in either of two circumferential grooves 52 formed in the axle 48 and spaced longitudinally therealong. Of course, each of the axles 34 and 48 has a second support wheel 36 mounted thereon, the support wheels 36 being of lightweight metal construction and including resilient peripheral tread rings 56 supported therefrom.

In addition, the side member 16 has the bifurcated right angulated base end 58 of a support arm 60 pivotally supported therefrom as at 62 and the support arm 60 mounts a seat cushion 64 therefrom and has a support leg 66 pivotally supported from its outer end as at 68, the free end of the support leg 66 including a horizontally enlarged foot 70.

The pivot structure 62 between the bifurcated base end 58 and the side member 14 includes frictional washers (not shown) whereby the support arm 60 may be frictionally retained in the raised phantom line position thereof illustrated in FIG. 2 of the drawings. In addition, the pivot connection at 68 also includes similar frictional washers whereby the support leg may be frictionally retained in the phantom line retracted position thereof illustrated in FIG. 2 of the drawings between opposing flanges of the support arm 60.

The side member 14 has the bifurcated base end 72 of a second support arm 74 supported therefrom by a friction washer equipped pivot connection 76 and the support arm 74 mounts a support table 78 therefrom equipped with a peripheral railing 80 disposed above the table 78. The table 78 is adapted to receive a cooler 82 thereon, see FIG. 1.

The upper end portion 20 also mounts an L-shaped bracket 84 therefrom equipped with a first "Velcro" panel 86 and a distance indicator of the LED or LCD readout and resettable type such as that indicated by the reference numeral 88 is removable from the bracket 84, the readout 88 being provided with a second type of "Velcro" panel for coaction with the panel 86 in order to removably anchor the readout 88 to the bracket 84. The readout 88 is, of course, electrically connected to a point assembly (not shown) also enclosed within the cover 38 and actuable by the point cam 37. In this manner, the distance travelled by the wheel mounted on the axle 34 may be indicated by the readout 88. The lower portions of the upper end portions 20 and 22 include a plurality of vertically spaced bar members 90 supported and extending therebetween (see FIG. 2) and the bar members 90 may be utilized to support any suitable articles such as a cloth or piece of clothing. In addition, the upper end portion 22 supports a hook 92 therefrom which may also be used to support a selected article.

Figure 9:
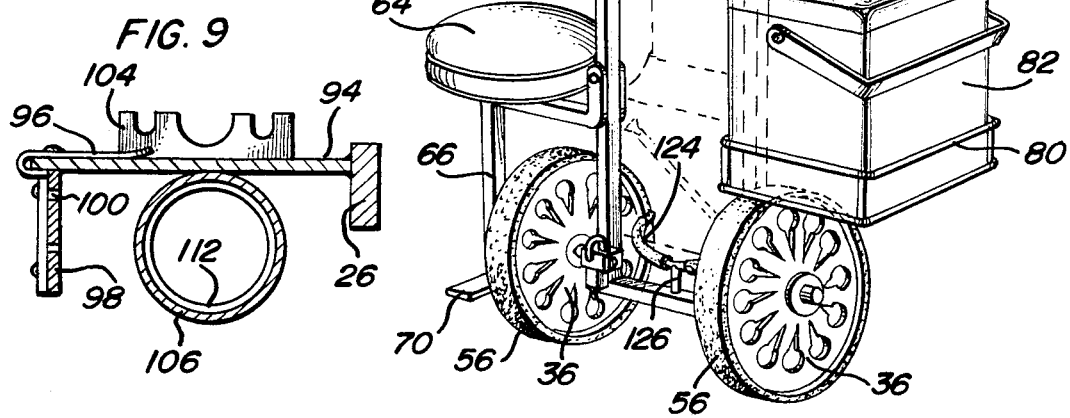
FIG. 9 is an enlarged vertical sectional view taken substantially upon the plane indicated by the section line 9—9 of FIG. 5.

The handle arm 26 mounts one longitudinal edge of a scorecard supporting panel 94 therefrom (see FIG. 5) and the other longitudinal edge of the panel 94 supports a pair of scorecard engageable clips 96 therefrom. The panel 94 extends longitudinally of the handle arm 26 and the marginal edge of the panel 94 remote from the handle arm 26 includes a depending apertured panel 98 supported therefrom. The panel 98 includes a plurality of apertures 100 formed therethrough and golf tees 102 may be wedged in the apertures 100 for support from the panel 98. Also, the end of the panel 94 remote from the handgrip 30 thereof includes a notched support 104 from which writing instruments may be supported and the underside of the panel 94 supports a tubular magazine 106 therefrom closed at its end remote from the handgrip 30 and including ball retaining fingers 108 at its end adjacent the handgrip 30. The magazine 106 includes a coiled compression spring (not shown) disposed therein and a plurality of golf balls 110 may be telescoped into magazine 106 against the biasing action of the aforementioned spring, the ball retaining fingers 108 preventing the outermost ball 110 from being discharged from the magazine 106. Further, from FIG. 9 of the drawings, it may be seen that the interior of the magazine 106 is lined with a smooth plastic sleeve 112. Also, if it is desired, the interior spring within the magazine 106 may be omitted and the golf ball 110 closest to the ball retaining fingers 108 may be discharged from the open end of the magazine toward the fingers 108 merely by tilting cart to a position such that the handle arm 26 is in a forward and downwardly inclined position.

Figure 5:
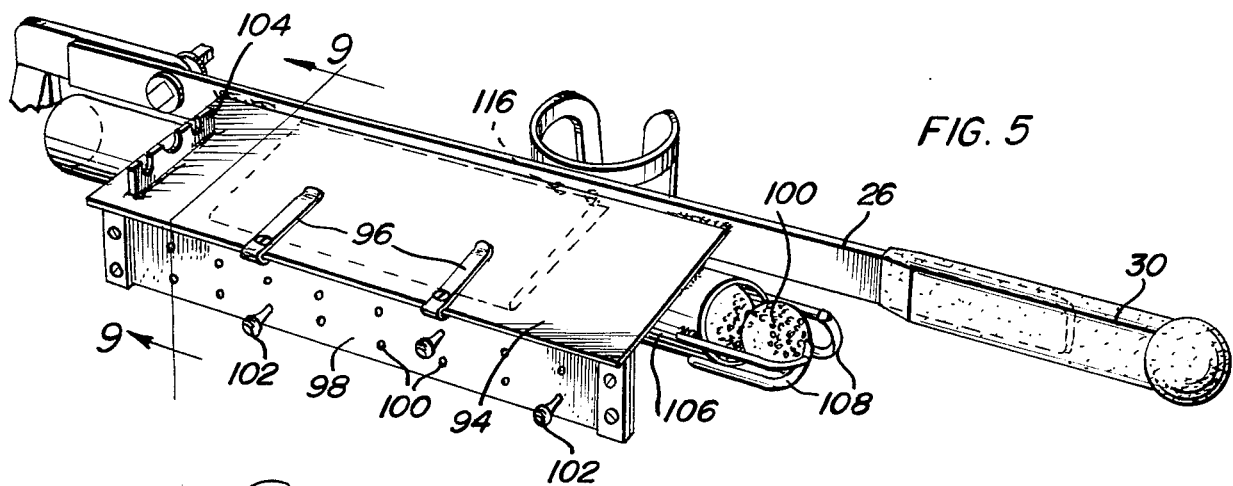
FIG. 5 is an enlarged perspective view of the handle of the golf carts.

From FIGS. 1, 2, 5 and 7 of the drawings, it may also be seen that the handle assembly supports a drinking container holder 114 therefrom, the holder 114 being pivotally mounted as at 116, see FIG. 5, or oscillation about a horizontal axis extending transversely of the handle arm 26.

The juncture between the upper end portions 20 and 22 of the side members 14 and 16 supports a rigid horizontal and rearwardly opening semi-cylindrical brace 118 therefrom with whose free ends a flexible and longitudinally stretchable elongated tension member 120 may be releasably engaged. The brace 118 and the tension member 120 encircle the upper end of a conventional golf bag 122 therefrom. A similar semi-cylindrical brace 124 is supported by a depending shank 126 from the central portion of the transverse member 18 and has the opposite ends of a second elongated flexible and longitudinally stretchable tension member 127 removably anchored to its opposite ends. The central portion of the transverse member 18 also includes a horizontally rearwardly projecting base 128 from whose outer free end of the base end 130 of a horizontally outwardly projecting and horizontally swingable kick stand 132 is pivotally mounted as at 134. The outer end of the kick stand 132 includes downwardly facing foot 136.

From FIGS. 1 and 2, it may be seen that an upstanding sleeve 140 is supported from the upper end portion 20 and equipped with a thumb screw 142. The lower end of an upstanding umbrella shank 144 is adjustably anchored in the sleeve 140.

It will be noted that the major components of the cart 10 are constructed of lightweight material such as aluminum, exclusive of the axles 34 and 48 from which the wheels 36 are supported as well as other minor components which may be constructed of other metals or plastic, and FIG. 8 of the drawings illustrates an adjustable set screw 148 by which upward swinging movement of the handle arm 26 may be adjustably limited.

Figure 10:
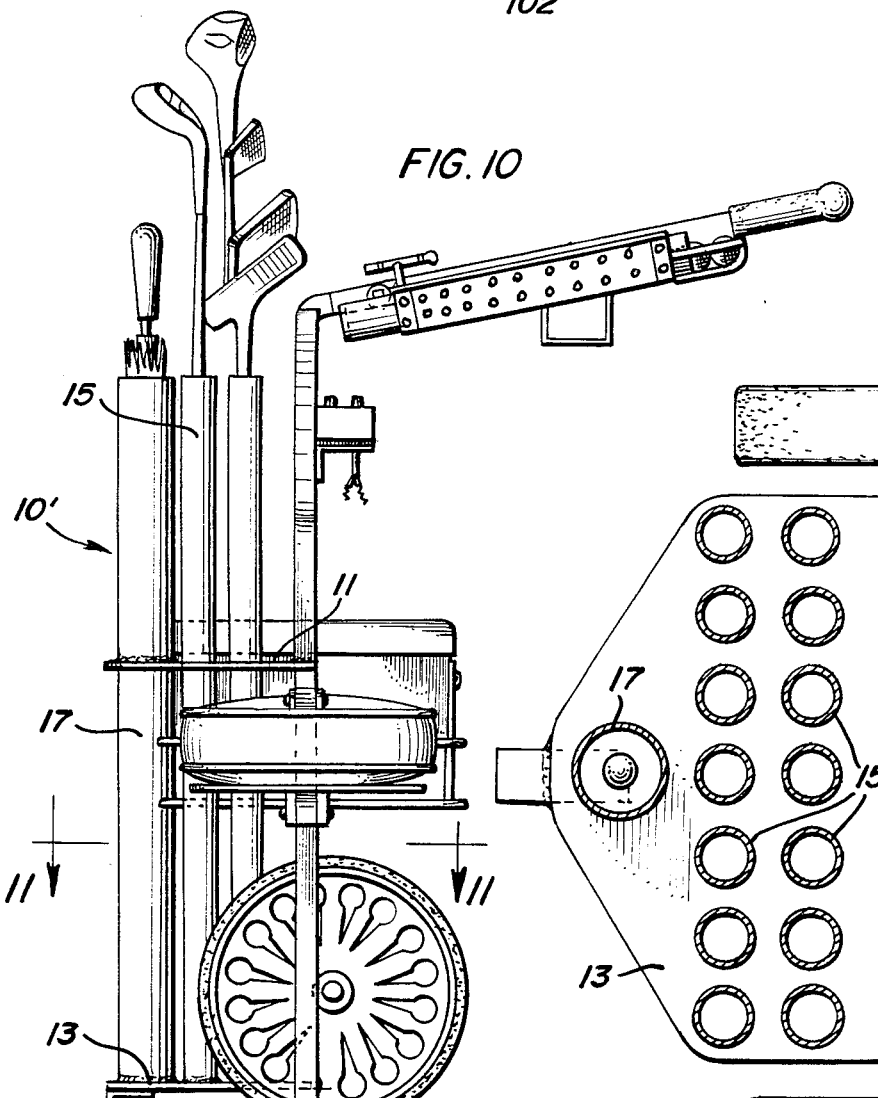
FIG. 10 is a side elevational view of a simplified modified form of golf cart.
Figure 11:
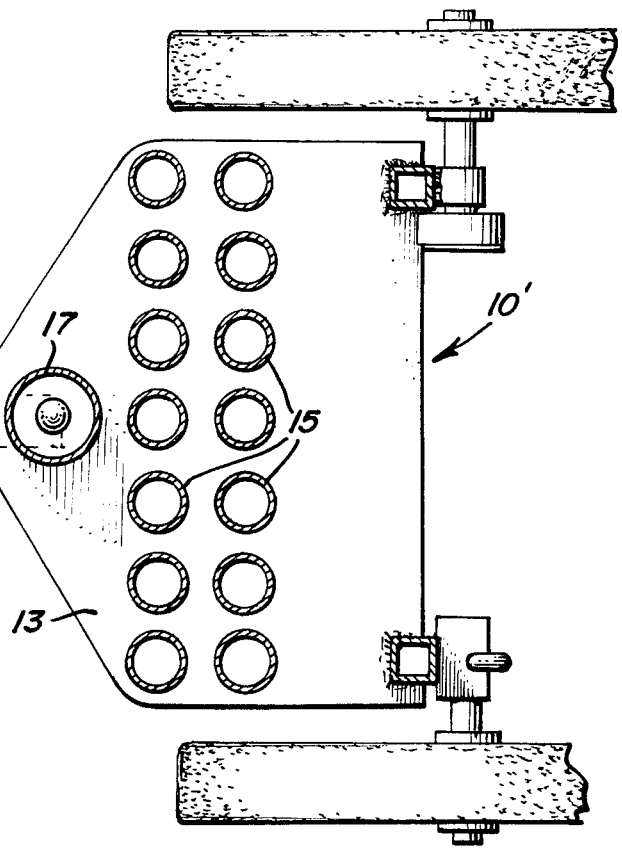
FIG. 11 is a fragmentary enlarged horizontal sectional view taken substantially upon the plane indicated by the section line 11—11 of FIG. 10.

With attention invited more specifically to FIGS. 10 and 11 of the drawings, there will be seen a modified form of golf cart referred to in general by the reference numeral 10' and which is substantially identical to the cart 10, except that the cart 10' includes vertically spaced horizontal plates 11 and 13 through which upper and lower end portions, respectively, of golf club shaft support tubes 15 and an umbrella support tube 17 are supported. The tubes 15 are used in lieu of the golf bag supporting braces 118 and 124 and the cart 10 may be provided with a tube corresponding to the tube 17, if desired. Otherwise, the cart 10' is substantially identical to the cart 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A golf cart including an upstanding frame having front and rear facing sides and laterally spaced generally parallel opposite side portions, opposite side ground engageable support wheel means, journal means journalling said wheel means from the lower ends of said opposite portions, an upper portion of said frame including a mount, and an elongated handle arm including base and handle defining ends, pivot means pivotally attaching said base end to said mount for swinging of said arm through a vertical plane between a depending retracted position generally closely paralleling said frame and a forwardly and upwardly incilned position projecting forwardly of said frame, means supported from said frame rearward of the latter for supporting a plurality of upstading golf clubs therefrom, each of said opposite side portions including a horizontally elongated support member, means mounting said support members from said side portions for vertical swinging about horizontal front-to-rear extending axes between operative horizontally outwardly projecting positions and raised inoperative positions projecting upward along said side portions, said support members, when in said operative positions, projecting horizontally outwardly beyond the corresponding wheel means, one of said horizontally elongated support members defining a table upon which a cooler may be placed and the other support member defining a seat, said other support member including a vertically swingable depending support leg mounted from its outer end, said support leg being swingable to a retracted position closely underlying said other support member, said leg, when said other member is in the operative position, including a lower end spaced considerably outward of and horizontally registered with the lower periphery of the adjacent wheel means, said journal means including means operative to adjustably axially shift said adjacent wheel means relative to said frame outwardly toward the lower end of said leg.

2. The cart of claim 1 wherein one of said wheel means includes rotation counting means operatively associated therewith and said frame includes resettable visual indicating means operatively connected to said rotation counting means and for indicating the number of revolutions of said one wheel means.

3. The cart of claim 1 wherein said pivot means includes friction means operative to frictionally lock said handle arm in selected angularly displaced positions thereof.

4. The cart of claim 3 wherein said pivot means includes means adjustably limiting swinging movement of said handle arm toward said forwardly and upwardly inclined position.

5. The cart of claim 1 wherein said frame includes means for support of the depending shank of an umbrella therefrom with the upper canopy portion of said umbrella disposed generally centrally over said cart.

6. The cart of claim 1 wherein said handle arm includes an elongated golf ball receiving magazine supported therefrom and extending longitudinally therealong.

7. The cart of claim 1 wherein said handle arm includes an upwardly opening drink receptacle support mounted thereon for angular displacement about a horizontal axis disposed transverse to said handle arm.

8. The cart of claim 1 wherein said handle arm includes a generally planar support panel extending longitudinally therealong and overlying said handle arm, said support panel including means for support of a scorecard thereon.

9. The cart of claim 8 wherein said handle arm includes an elongated golf ball receiving magazine supported therefrom and extending longitudinally therealong, said ball receiving magazine being disposed immediately beneath and supported from said handle arm.

10. The cart of claim 9 wherein said handle arm includes an upwardly opening drink receptacle support mounted therefrom for angular displacement about a horizontal axis disposed transverse to said handle arm.

11. The cart of claim 1 wherein said means supported from said frame for supporting a plurality of upstanding golf clubs therefrom includes a pair of upper and lower horizontally disposed and rearwardly opening partial cylindrical braces in vertical registry with each other and a rearwardly projecting support mounted from a central lower portion of said frame and adapted to support the lower end of a golf bag therefrom with said bag being cradled in said braces.

12. The cart of claim 1 wherein said means supported from said frame for supporting a plurality of upstanding golf clubs therefrom includes a pair of upper and lower rearwardly projecting plates mounted from said frame and a plurality of upwardly opening upstanding tubes having upper and lower portions supported from said plates.

* * * * *